Sept. 11, 1956  R. W. HUZZARD  2,762,648
INTERCONNECTED VEHICLE REAR WINDOW AND SEAT
FOR MOVEMENT IN UNISON
Original Filed April 5, 1952  3 Sheets-Sheet 1
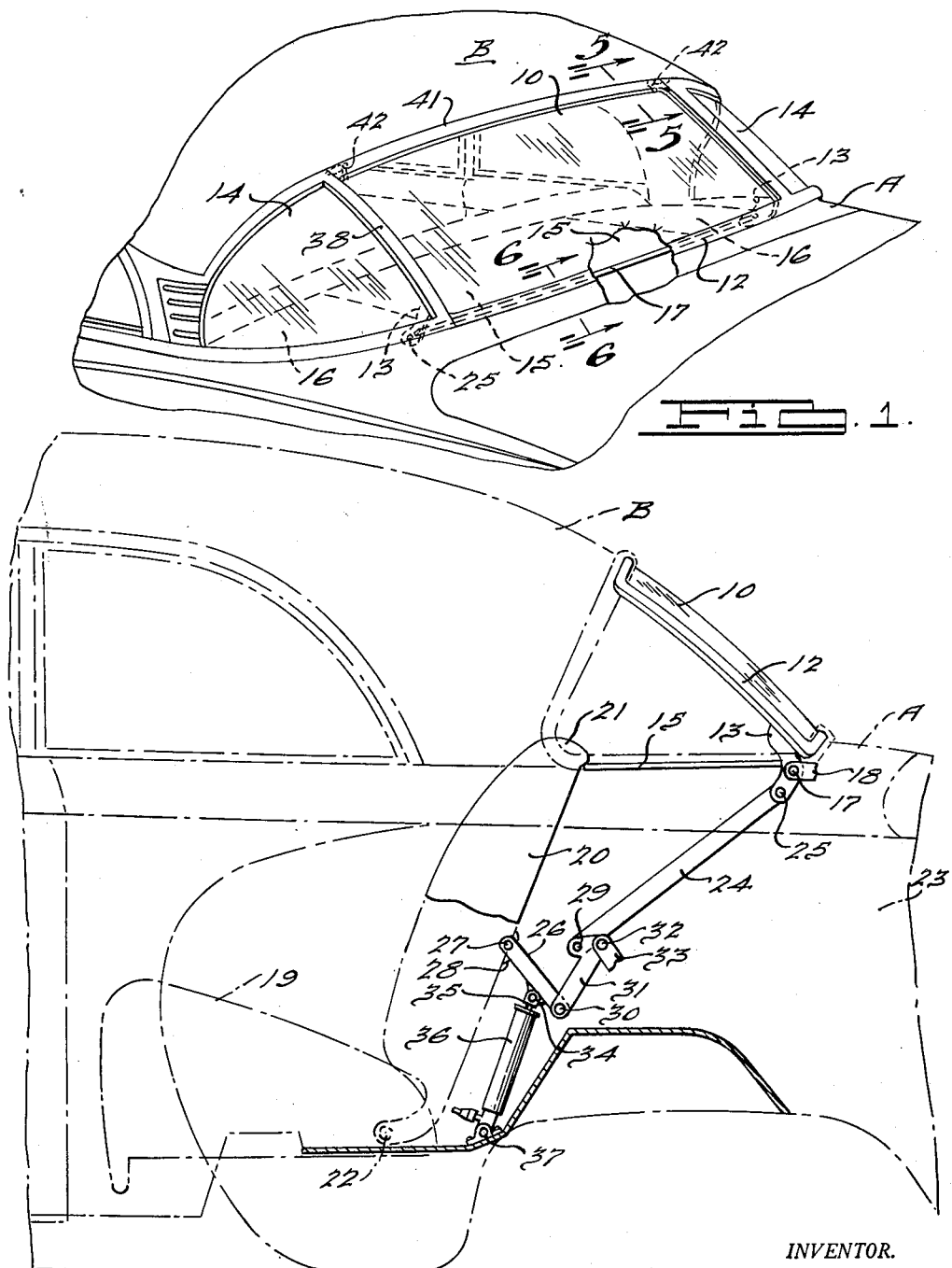
INVENTOR.
Robert W. Huzzard.
BY
Elmer Jamison Gray
ATTORNEY.

Sept. 11, 1956  R. W. HUZZARD  2,762,648
INTERCONNECTED VEHICLE REAR WINDOW AND SEAT
FOR MOVEMENT IN UNISON
Original Filed April 5, 1952  3 Sheets-Sheet 2
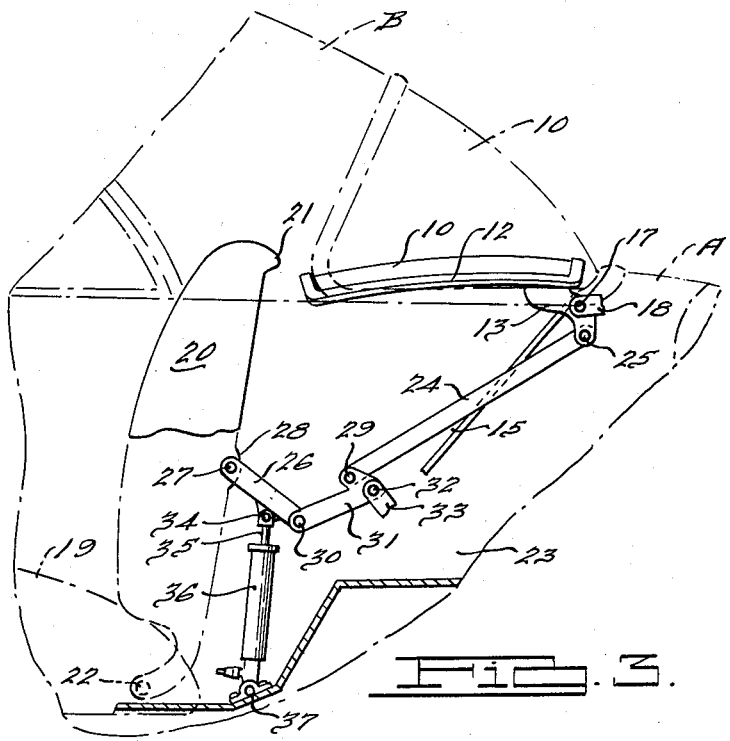
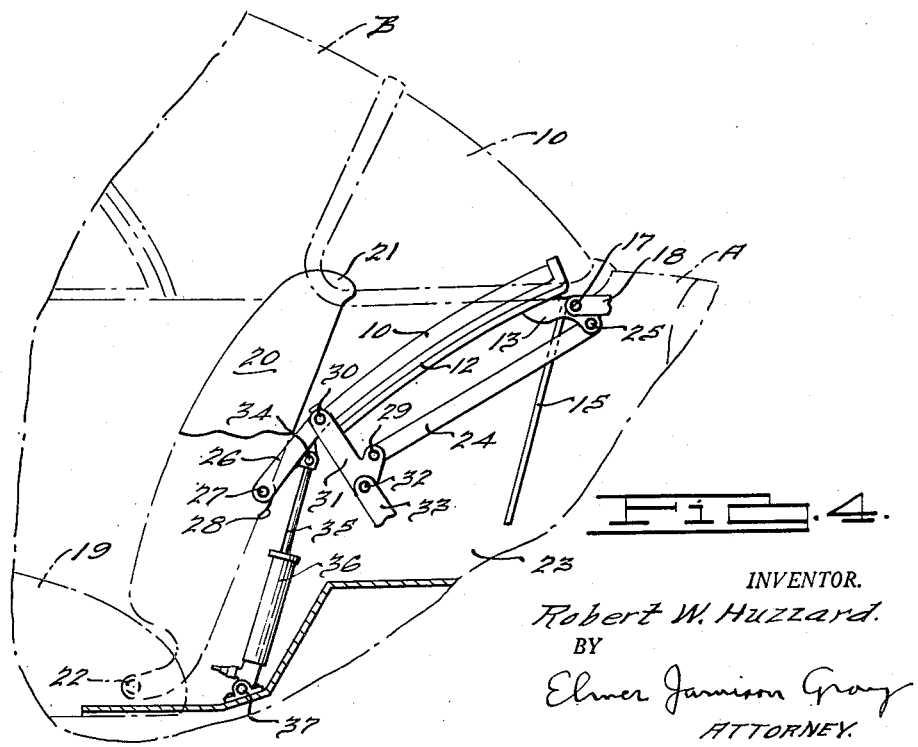
INVENTOR.
Robert W. Huzzard.
BY
Elmer Jamison Gray
ATTORNEY.

Sept. 11, 1956 R. W. HUZZARD 2,762,648
INTERCONNECTED VEHICLE REAR WINDOW AND SEAT
FOR MOVEMENT IN UNISON
Original Filed April 5, 1952 3 Sheets-Sheet 3

INVENTOR.
Robert W. Huzzard.
BY
Elmer Jamison Gray
ATTORNEY.

United States Patent Office 2,762,648
Patented Sept. 11, 1956

2,762,648

INTERCONNECTED VEHICLE REAR WINDOW AND SEAT FOR MOVEMENT IN UNISON

Robert W. Huzzard, Detroit, Mich., assignor, by mesne assignments, to Chrysler Corporation, a corporation of Delaware Continuation of application Serial No. 280,802, April 5, 1952. This application June 16, 1953, Serial No. 361,943

12 Claims. (Cl. 296—44)

This invention relates to improvements in a vehicle body construction and in particular to ventilating rear windows for automobile bodies, the invention being especially useful in connection with so-called hard-top convertible type automobiles. This application is a continuation of co-pending application Serial No. 280,802, filed April 5, 1952, now abandoned.

An object of the invention is to provide an improved ventilating rear window structure for an automobile body wherein the rear window is hinged adjacent its lower edge so as to permit the upper edge to swing forward and downward from a raised to a lowered position for ventilating the body, the operating mechanism for the window being arranged in the space behind the rear seat or at the forward end of the vehicle luggage compartment and being operable to swing the window into fully open position.

In many conventional automobiles of the so-called hardtop convertible type the position of the back of the rear seat with relation to the rear window is such as to afford insufficient space to permit the rear window panel, if hinged at its lower edge, to be swung forward and downward to a horizontal position without interference with the seat back. If it is sought to accomplish this purpose the window panel will strike the upper edge of the seat back and, hence, will not clear the seat so as to enable it to be disposed behind the seat at a position in which it will not interfere with the rear seat passenger. This difficulty is overcome by the present invention, an object of which is to provide a mechanism for swinging the rear window panel forward and downward to a wide open position and at the same time swinging the rear seat back forward to provide clearance for the passage of the window panel and thereafter restoring the seat back to normal position. The operating mechanism for the rear window panel is thus coupled to the rear seat back which is hinged at its lower edge so as to swing in unison with the window panel as the latter is swung from the raised and lowered positions.

A further object of the invention is to provide a hinged window and seat back coupled to move in unison as aforesaid, in combination with a package tray secured to the window to swing as a unit therewith and extending forward from the window toward the seat back when the window is in the raised position, thereby to conceal the operating mechanism therebelow and also to serve in a conventional manner to hold lightweight articles or packages.

In accordance with the embodiment of the invention, herein illustrated by way of example, the operating mechanism for the rear window panel and hinged seat back comprises a pair of toggle means interposed between the seat back and a bracket secured to the window adjacent the lower edge thereof. The toggle means includes a rearwardly inclined connecting link pivotally connected at its rear end to the bracket below the hinge axis of the window, a forwardly inclined connecting link pivotally connected at its forward end to the seat back above the hinge axis of the latter, an intermediate integral two-arm member pivotally connected to the body, one arm of said member extending generally forward when the window is in the raised position and being connected to the forward end of the rearwardly inclined link, the other arm being declined forwardly when the window is in the raised position and being pivotally connected to the rear end of the rearwardly inclined link. A fluid actuated plunger below the rearwardly inclined link is connected thereto for actuating the operating mechanism. The plunger is shiftable upward to swing the arms of said intermediate member through slightly more than 90° and thereby to swing the seat back first forwardly and then rearwardly in unison with swinging of the window to or from the lowered position.

Other objects of this invention will appear in the following description and appended claims, reference being had to the accompanying drawings forming a part of this specification wherein like reference characters designate corresponding parts in the several views.

Fig. 1 is a fragmentary perspective rear view of the exterior of an automobile body embodying the present invention.

Fig. 2 is a fragmentary enlarged side view showing the rear window in the raised or closed position, portions of the floor board and seat-back being broken away and the major portion of the body being shown in phantom.

Fig. 3 is a view similar to Fig. 2, but showing the rear window at an intermediate position.

Fig. 4 is a view similar to Fig. 2, but showing the rear window at the lowered or open position.

Figure 5:
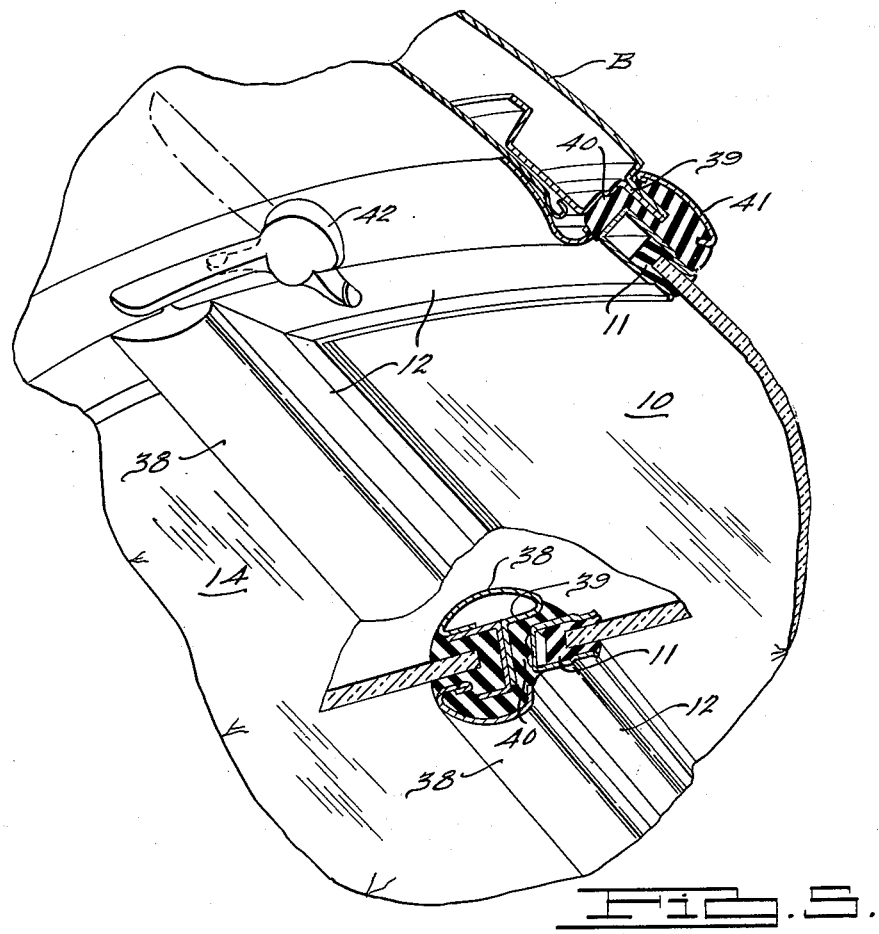
Fig. 5 is a fragmentary enlarged view of the interior of the body, looking rearward toward the upper right portion of the rear window, parts being broken away to show the upper and right side rails for the rear window frame in sectional views taken in the direction of the arrows along the two lines 5—5 of Fig. 1.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawings, there is illustrated in Fig. 1 an automobile body A having a hard-top B and a hinged rear window 10. In the present instance, the window 10 comprises a curved glass panel having its edges firmly confined within a peripheral channel-like molding comprising an inner cushioning and weather seal 11 of rubber or rubber like material and an outer molding 12 of protective material, as for example chrome plated steel, Figs. 5 and 6. The window 10 is supported at opposite sides by a pair of depending hinge or bracket arms 13 secured to the lower side portions of the molding 12 and extends transversely for the major portion of the body width. A pair of fixed lateral rear window panels 14 flank the window 10.

Extending generally horizontally from the lower edge of the window 10 when the latter is in the raised position, Fig. 2, and rigidly secured at opposite sides to the hinge or bracket arms 13 is a swinging package tray or shelf panel 15. The latter extends transversely not less than the transverse width of the window 10 and is flanked by fixed generally horizontal package tray portions 16. The hinge arms 13 are suitably keyed to a transverse shaft 17 near opposite ends thereof, which is located below the rearmost edge of the window 10 and pivotally supported by fixed brackets 18 secured to the vehicle body A.

Forward of the window-tray combination or unit is a seat 19 which may be conventional and may comprise either the rear seat of a sedan or tudor type automobile or the driver's seat of a coupe type automobile. A seat back 20 extends upward from the rear edge of the seat 19 at a location forward of the tray 15 and is provided with an upper edge portion 21 which overhangs and conceals the forward edge of the tray 15 when the window 10 is in the raised position. In order to permit forward and downward swinging of the window 10 to and from a lowered position below the overhang 21, as described below, Figs. 3 and 4, the back 20 is hinged at 22 adjacent its lower edge and the rear edge of the seat 19.

From the foregoing it will be seen that the window panel 10 in the raised or closed position, Fig. 2, cooperates with the lateral window panels 14 to close the entire rear window area. Likewise, the package tray 15 in cooperation with the lateral tray portions 16 completely fills the substantially horizontal area between the shaft 17 and upper portion of the seat back 20, comprising both a continuous package tray between the back 20 and window 10 and also a shield to conceal the window operating mechanism located in the forward portion of the vehicle luggage compartment 23. Upon forward and downward pivoting of the window 10 and brackets 13 about the axis of the shaft 17, the tray 15, also secured to the brackets 13, swings downward into the luggage compartment 23, leaving an opening between the lateral tray portions 16 for passage of the window 10 to be lowered position within the compartment 23, Fig. 4, provided that the seat-back 20 is swung forward and out of the path of the forward edge of the window panel 10.

Pivoting of the seat-back 20 forward in unison with swinging of the window 10 to and from the raised and lowered positions is accomplished by a fluid actuated linkage or operating mechanism connecting the window 10 and back 20 substantially in a plane extending longitudinally of the vehicle through one of the brackets 13. This mechanism includes a comparatively long rearwardly inclined link 24 pivotally connected near its rear end at 25 to a depending portion of one of the brackets 13 at a location below the pivotal axis of the shaft 17. A shorter forwardly inclined link 26 is pivotally connected near its forward end at 27 to a bracket 28 secured to the midportion of the back 20. The forward and rearward ends respectively of links 24 and 26 are pivotally connected at 29 and 30 to the ends of a pair of integral arms of an intermediate coupling member 31 which in turn is pivotally connected at 32 to a fixed bracket 33 secured to the body A. In order that the window 10 will swing downward upon rearward shifting of rod 24, the pivot 25 is located below and rearward of the dead center line connecting pivots 17 and 29. The pivot 32 is located at approximately the level of the pivot 27 and intermediate the ends of the link 24, preferably near the forward end of the latter. The shorter arm of the member 31, connecting the pivots 29 and 32, extends substantially horizontally forward from the pivot 32 to the pivot 29 when the window 10 is in the raised position, Fig. 2, whereas the longer arm connecting the pivots 32 and 30 declines forward from the pivot 32 to the pivot 30 at approximately a 45° angle from the shorter arm.

Pivotally connected at 34 to the link 26 near the pivot 30 is the upper end of a plunger rod 35 reciprocable within a fluid cylinder 36. The latter is pivotally connected to the vehicle floor at 37 rearward of and adjacent the back 20 and extends upward approximately in parallelism therewith. The cylinder 36 is also suitably connected with a source of fluid, such as vacuum, compressed air or liquid under pressure, whereby the plunger 35 is selectively extended or retracted. Upon vertical extension of the plunger 35 from the position of Fig. 2, the pivots 27, 30 and 32 are moved toward a position of linear alignment, Fig. 3, causing the back 20 to swing forward and out of the path of swinging movement of the window 10. Simultaneously the pivot 29 is swung upward and rearward, shifting the link and rod 24 rearward. In consequence pivot 25 is swung rearward about the axis of the shaft 17, causing the upper portions of both brackets 13 and the connected window 10 and tray 15 to swing downward about the axis 17.

Upon continued vertical extension of plunger 35 beyond the position of dead center or linear alignment of the pivots 27, 30 and 32, the back 20 is returned substantially to its normal or rest position, Fig. 4. Meanwhile the intermediate coupling 31 will have been rotated clockwise in the drawings slightly more than 90°, shifting rod 24 still further rearward to swing the window 10 and connected tray 15 to the lowered position within the compartment 23 and behind the seat-back 20. Upon the retraction or downward stroke of plunger 35, the reverse operation occurs. The seat back 20 is again swung forward to the position of Fig. 3 to provide clearance for the window 10 which is swung upward by the forward shifting of link and rod 24. Again as the window 10 moves to the final raised position of Fig. 1, the pivot 30 moves below its position of alignment with the pivots 27 and 32 and the seat-back 20 is returned to its rest position with the edge 21 overlying and concealing the forward edge of the tray 15, which latter is likewise returned to its initial substantially horizontal position.

Similarly to the glass panel of the window 10, the edges of the lateral panels 14 are confined within armoured channel-like weather seal moldings 38, Fig. 5. The upright portions of the moldings 38, together with the edges of the roof structure B along the upper edge of the window 10 in the raised position, are formed to provide rabbeted portions 39 adapted to receive the portions of the window moldings 12 along the lateral and swinging edges of the window 10. The rabbeted portions 39 are also formed to retain a compressible sealing strip 40 of rubber-like material into which the window moldings 12 seat at a weather proof seal when the window 10 is in the closed or raised position. An exterior ornamental top molding 41 is suitably secured in position adjacent the upper edges of the panels 14 and the roof portions forming the rabbet 39 to conceal the same. The window 10 is suitably locked in the closed or raised position by a pair of friction latches 42 pivoted on the interior of the roof B adjacent the lateral upper edges of the window 10. Upon turning the latches 42 from the solid line position, Fig. 5, to the phantom position, the window 10 is released for forward and downward swinging.

Figure 6:
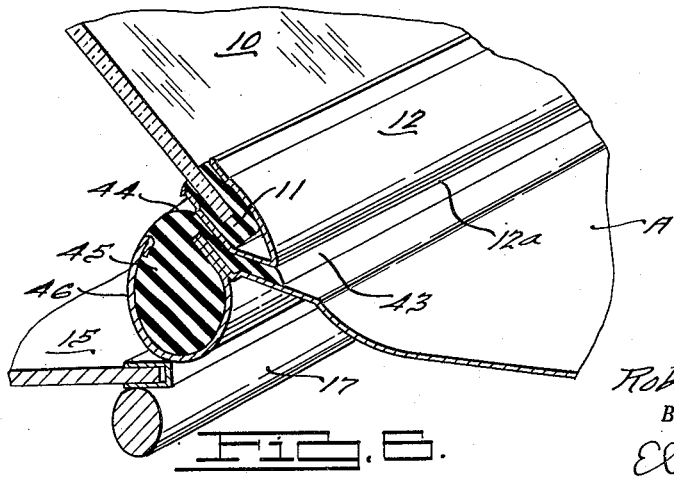
Fig. 6 is an enlarged fragmentary section taken in the direction of the arrows along the line 6—6 of Fig. 1.

The molding 12 at the lower or hinged edge of the window 10 tapers outward at 12a from the window panel and seats in a transverse cushioning and weather seal strip 43 of rubber-like material when the window 10 is in the raised position, Fig. 6. The strip 43 is supported by a transverse flange 44 of the body A which extends forwardly and below the strip 43. Interiorly, the strip 43 enlarges and extends downward around the forward edge of the flange 44 as a horizontal bolster 45. The latter extends transversely for at least the transverse width of the window 10 and conceals the gap between the flange 44 and rear edge of the tray 15. A metallic ornamental channel molding 46 having a rear upper edge welded to the underside of the flange 44 extends transversely the length of the bolster 45 and forward partially around the underside thereof, both to conceal and support the same.

I claim:

1. In a vehicle body having a seat, a rear window structure for said body and pivoted thereon to swing forward and downward from a raised position to a lowered position, a back for the seat normally within the path of swinging movement of said window structure and being shiftable to a forward position out of said path, toggle means connecting said body and back for shifting the latter to and from the forward position, toggle means connecting the first toggle means and window structure for swinging the latter between the raised and lowered positions in unison with shifting of said back from said path.

2. In a vehicle body having a seat, a rear window structure for said body and pivotal to swing forward and downward from a raised position to a lowered position, a back for the seat normally within the path of swinging movement of the window structure and shiftable to a forward position out of said path, and means for shifting the back to and from the forward position in unison with swinging of the window structure between the raised and lowered positions comprising a connecting rod pivotally connected at one end to said window structure, a second connecting rod pivotally connected at one end to said back, and an intermediate swinging member pivotally connected to the body, said member having one integral arm pivotally connected to the other end of the first rod and having a second integral arm pivotally connected to the other end of the second rod.

3. In a vehicle body having a seat, a rear window structure for said body and pivotal to swing forward and downward from a raised position to a lowered position, a back for the seat normally within the path of swinging movement of the window structure and shiftable to a forward position out of said path, and means for swinging the back to and from the forward position in unison with swinging of the window between the raised and lowered positions comprising a bracket connected to said window adjacent the lower edge thereof, a connecting rod pivotally connected at one end to said bracket at a location below the hinge axis of said window, a second connecting rod pivotally connected at one end to said back at a location above the hinge axis thereof, and an intermediate swinging member pivotally connected to the body, said member having one integral arm pivotally connected to the other end of the first rod and a second integral arm pivotally connected to the other end of the second rod.

4. In a vehicle body having a seat, a rear window structure hinged adjacent one edge to the body for swinging the opposite edge forward and downward from a raised position above said one edge to a lowered position below said one edge, a back for the seat having an upper portion normally within the forward portion of the path of swinging movement of said window structure and being pivotal about a hinged lower portion of the back to swing to and from a forward position out of said path, and means for shifting the back to and from the forward position in unison with swinging of the window structure between the raised and lowered positions comprising a connecting rod pivotally connected at one end to said window structure, a second connecting rod pivotally connected at one end to said back, and an intermediate swinging member pivotally connected to the body, said member having one integral arm pivotally connected to the other end of the first rod and having a second integral arm pivotally connected to the other end of the second rod.

5. In a vehicle body having a seat, a rear window hinged adjacent one edge to the body for swinging the opposite edge forward and downward from a raised position above said one edge to a lowered position below said one edge, a back for the seat having an upper portion normally within the forward portion of the path of swinging movement of said window and being hinged at a lower portion to swing to and from a forward position out of said path, and means for swinging the back to and from the forward position in unison with swinging of the window between the raised and lowered positions comprising a bracket connected to said window adjacent the lower edge thereof, a connecting link pivotally connected at one end to said bracket at a location below the hinge axis of said window, a second connecting link pivotally connected at one end to said back at a location above the hinge axis thereof, and an intermediate swinging member pivotally connected to the body, said member having one integral arm pivotally connected to the other end of the first link and a second integral arm pivotally connected to the other end of the second link.

6. In a vehicle body, a rear window pivotal between raised and lowered positions, a seat-back adjacent said window and mounted to move forward and rearward, a package tray connected to and extending forward from said window toward said seat-back when the window is in the raised position and being pivotal with said window to extend downward behind said seat-back when the window is in the lowered position, and means connecting the window and seat-back to move the latter forward and rearward upon swinging of the window between the raised and lowered positions.

7. In a vehicle body having a seat, a rear window for said body and pivoted thereon to swing forward and downward from a raised to a lowered position, a back for said seat normally at a rest position within the path of swinging movement of said window and shiftable to a forward position out of said path, means connecting the window and back for shifting the latter to and from the forward position in unison with swinging of the window between the raised and lowered positions, the back being at said rest position when the window is at either the raised or lowered position, and a package tray connected to and extending forward from said window toward said back when the window is in the raised position and being pivotal with the latter to extend downward behind said seat when the window is in the lowered position.

8. In a vehicle body having a seat, a rear window panel for said body and pivotal to swing forward and downward from a raised position to a lowered position, a back for the seat normally within the path of swinging movement of the window panel and shiftable to a forward position out of said path, means for swinging the back to and from the forward position in unison with swinging of the window panel between the raised and lowered positions comprising a link pivotally connected at one end to the lower edge of the window panel below the hinge axis thereof, a second link pivotally connected at one end to said back at a location above the hinge axis thereof, an intermediate swinging member pivotally connected to the body, said member having one arm pivotally connected to the other end of the first link and a second arm pivotally connected to the other end of the second link, and a package tray connected to and extending forward from said window panel toward said back when the window panel is in the raised position and being pivotal with the latter to extend downward behind said seat when the window panel is in the lowered position.

9. In a vehicle body having a seat, a rear window structure for said body and pivotal to swing forward and downward from a raised position to a lowered position, a back for the seat normally within the path of swinging movement of the window structure and shiftable to a forward position out of said path, means for shifting the back to and from the forward position in unison with swinging of the window structure between the raised and lowered positions comprising a connecting link pivotally connected at one end to said window structure, a second connecting link pivotally connected at one end to said back, and an intermediate swinging member pivotally connected to the body, said member having one arm pivotally connected to the other end of the first link and having a second arm pivotally connected to the other end of the second link, and fluid actuated means for actuating said coupling means.

10. In a vehicle body having a seat, a rear window hinged adjacent one edge of the body to permit the opposite edge to swing forward and downward from a raised position above said one edge to a lowered position below said one edge, a back for the seat having an upper portion normally within the forward portion of the path of swinging movement of said window structure and being pivotal to swing to and from a forward position out of said path, operating means for swinging the back to and from the forward position in unison with swinging of the window between the raised and lowered positions comprising a connecting link pivotally connected at one end to the window panel below the hinge axis thereof, a second connecting link pivotally connected at one end to said back at a location above the hinge axis thereof, an intermediate swinging member pivotally connected to the body, said member having one arm pivotally connected to the other end of the first link and a second arm pivotally connected to the other end of the second link, and fluid actuated means connected with said second link to actuate said operating means.

11. In a vehicle body structure having a rear portion containing a rear window opening, a rear window panel in said opening and pivoted adjacent its lower edge on said structure to swing forwardly from said rear portion to an open position, a bracket secured to said window panel adjacent said lower edge and having a portion extending below said edge, a seat having a back portion normally within the path of swinging movement of said window panel and shiftable from said path, and means connecting said portion of said bracket and back portion to shift the latter from said path upon swinging of the window panel to the open position.

12. A vehicle body structure having a top, said top having a rear window opening therein, a rear window panel pivoted adjacent its lower edge on said structure to swing forward and downward with respect to said top from a raised position to a lowered position, a bracket secured to said panel and having an extension below said edge, a seat having an upper back portion normally within the forward portion of the path of swinging movement of said window panel and being shiftable forwardly from said path, means connecting said structure and back portion for shifting the latter forwardly, and means connecting said last named means and extension for swinging said panel through said forward portion of said path in unison with shifting of said back forwardly from said path.

References Cited in the file of this patent
UNITED STATES PATENTS

| | | |
|---|---|---|
| 2,376,949 | Westrope | May 29, 1945 |
| 2,580,487 | Vigmostad | Jan. 1, 1952 |

FOREIGN PATENTS

| | | |
|---|---|---|
| 629,829 | Germany | May 13, 1936 |
| 464,270 | Great Britain | Apr. 14, 1937 |
| 326,211 | Italy | May 6, 1935 |